United States Patent [19]

Ejima et al.

[11] Patent Number: 5,303,049

[45] Date of Patent: Apr. 12, 1994

[54] ELECTRONIC STILL CAMERA WITH ENHANCED TONAL RENDITION

[75] Inventors: Satoshi Ejima, Tokyo; Takao Ikuma, Kawasaki, both of Japan

[73] Assignee: Nikon Corporation, Tokyo, Japan

[21] Appl. No.: 640,922

[22] Filed: Jan. 14, 1991

[30] Foreign Application Priority Data

Jan. 18, 1990 [JP] Japan ................................ 2-9315

[51] Int. Cl.⁵ ........................ H04N 5/30; H04N 5/225
[52] U.S. Cl. ............................ 348/231; 358/909.1; 348/221
[58] Field of Search ............. 358/209, 909, 906, 335, 358/213.19, 211, 228; 354/431, 429, 432, 410; H04N 9/79, 5/26, 5/225, 5/30

[56] References Cited

U.S. PATENT DOCUMENTS

| | | | |
|---|---|---|---|
| 4,047,187 | 9/1977 | Mashimo et al. | 354/402 |
| 4,302,780 | 11/1981 | Yamazaki et al. | 354/432 |
| 4,476,383 | 10/1984 | Fukuhara et al. | 354/432 |
| 4,647,975 | 3/1987 | Alston et al. | 358/209 |
| 4,929,824 | 5/1990 | Miyazaki | 354/432 |
| 4,951,147 | 8/1990 | Aknar et al. | 358/209 |
| 4,978,990 | 12/1990 | Yamasaki et al. | 354/432 |
| 5,010,359 | 4/1991 | Maitani | 354/410 |
| 5,016,107 | 5/1991 | Sasson et al. | 358/209 |
| 5,101,276 | 3/1992 | Ohta | 358/213.19 |
| 5,144,442 | 9/1992 | Ginosar et al. | 358/209 |

*Primary Examiner*—James J. Groody
*Assistant Examiner*—Safet Metjahic
*Attorney, Agent, or Firm*—Shapiro and Shapiro

[57] ABSTRACT

An electronic still camera having an image pickup device for converting the image of an object into an image signal; a regulator for regulating the amount of exposure of the image pickup device; a controller for causing the image pickup device to generate the image signal plural times and controlling the regulator in such a manner that the plural image signals have mutually different amounts of exposure; a mean calculator for calculating the mean value of data of mutually corresponding pixels in the plural image signals; and a recording device for recording a mean image signal thus obtained.

6 Claims, 6 Drawing Sheets

FIG. 3

| 176 | 224 | 255 | 218 | 178 | 132 | 126 | 118 |
|-----|-----|-----|-----|-----|-----|-----|-----|
| 219 | 255 | 255 | 255 | 217 | 166 | 131 | 110 |
| 178 | 224 | 255 | 223 | 182 | 144 | 119 | 96  |
| 144 | 156 | 173 | 158 | 134 | 112 | 108 | 110 |
| 98  | 102 | 115 | 103 | 86  | 103 | 116 | 124 |
| 42  | 37  | 38  | 41  | 40  | 68  | 92  | 86  |
| 0   | 0   | 0   | 0   | 0   | 29  | 33  | 36  |
| 0   | 0   | 0   | 0   | 0   | 0   | 0   | 0   |

FIG. 4

| 226 | 255 | 255 | 255 | 224 | 182 | 176 | 168 |
|-----|-----|-----|-----|-----|-----|-----|-----|
| 255 | 255 | 255 | 255 | 255 | 216 | 181 | 160 |
| 228 | 255 | 255 | 255 | 232 | 194 | 169 | 146 |
| 194 | 206 | 223 | 208 | 184 | 162 | 158 | 160 |
| 148 | 152 | 165 | 153 | 136 | 153 | 166 | 174 |
| 92  | 87  | 88  | 91  | 90  | 118 | 142 | 136 |
| 45  | 42  | 46  | 45  | 46  | 69  | 83  | 86  |
| 25  | 28  | 27  | 29  | 26  | 32  | 35  | 40  |

FIG. 5

| 126 | 174 | 225 | 168 | 124 | 82 | 76 | 68 |
|-----|-----|-----|-----|-----|-----|-----|-----|
| 169 | 205 | 238 | 216 | 167 | 116 | 81 | 60 |
| 128 | 174 | 221 | 173 | 132 | 94 | 69 | 46 |
| 94 | 106 | 123 | 108 | 84 | 62 | 58 | 60 |
| 48 | 52 | 65 | 53 | 36 | 53 | 66 | 74 |
| 0 | 0 | 0 | 0 | 0 | 18 | 42 | 35 |
| 0 | 0 | 0 | 0 | 0 | 0 | 0 | 0 |
| 0 | 0 | 0 | 0 | 0 | 0 | 0 | 0 |

FIG. 6

| 176 | 214 | 240 | 211 | 178 | 132 | 126 | 118 |
|-----|-----|-----|-----|-----|-----|-----|-----|
| 212 | 230 | 246 | 235 | 211 | 166 | 131 | 110 |
| 178 | 214 | 238 | 214 | 182 | 144 | 119 | 96 |
| 144 | 156 | 173 | 158 | 134 | 112 | 108 | 110 |
| 98 | 102 | 115 | 103 | 86 | 103 | 116 | 124 |
| 47 | 43 | 44 | 45 | 45 | 68 | 92 | 86 |
| 22 | 21 | 23 | 22 | 23 | 35 | 41 | 43 |
| 12 | 14 | 13 | 14 | 13 | 16 | 17 | 20 |

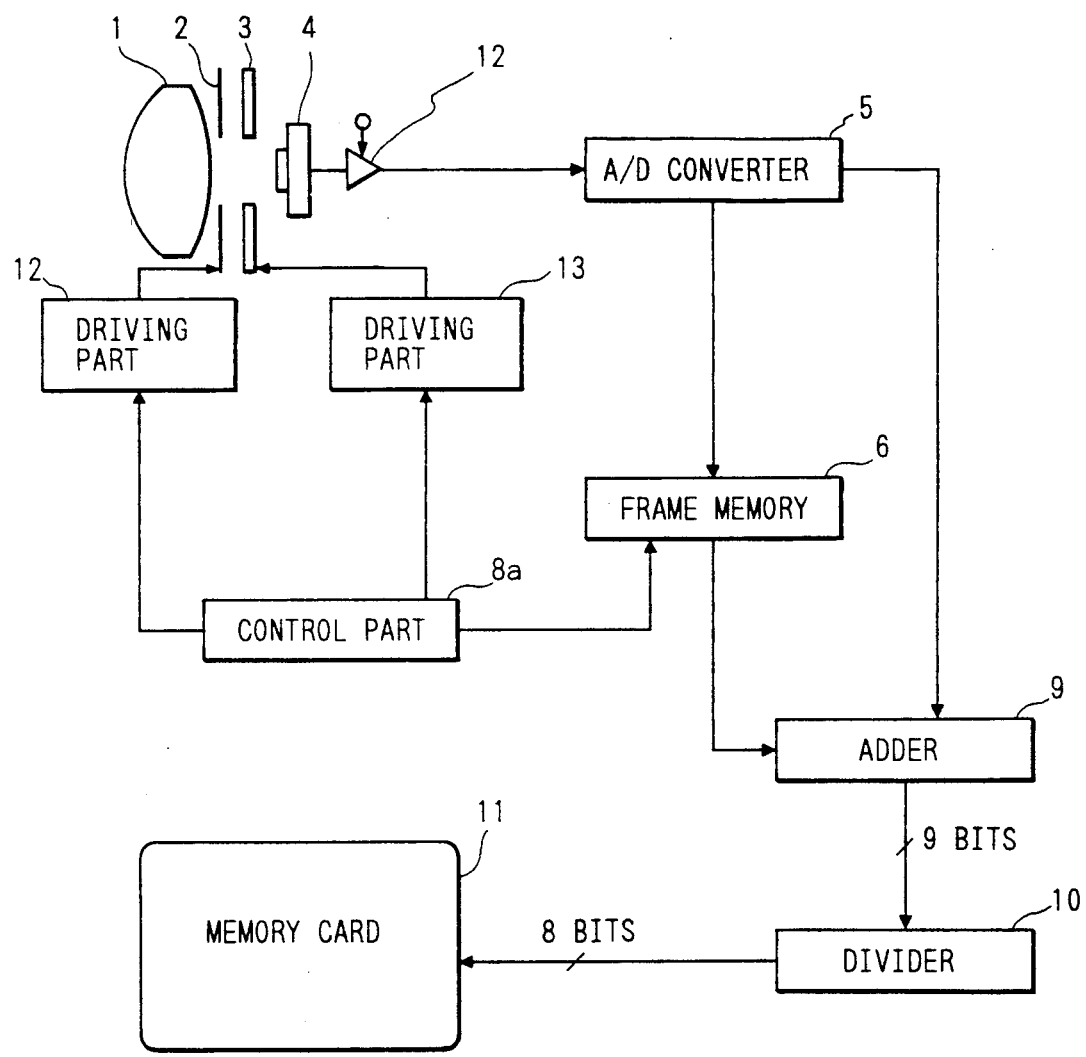

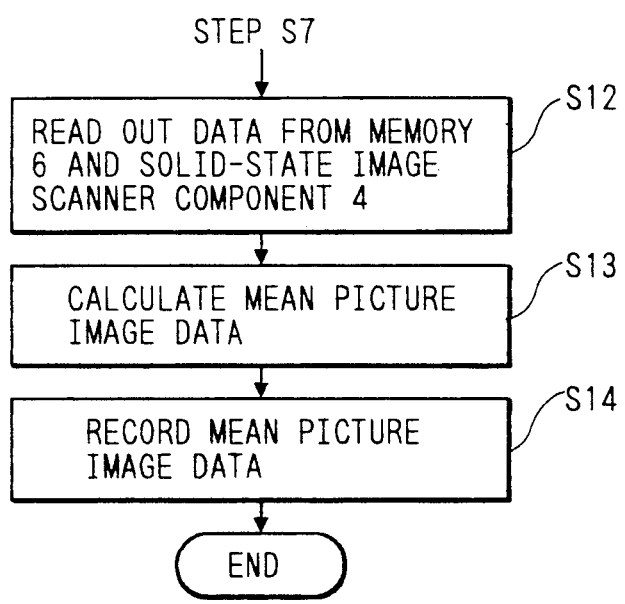

ELECTRONIC STILL CAMERA WITH ENHANCED TONAL RENDITION

BACKGROUND OF THE INVENTION

1. Field of the Invention

The present invention relates to an electronic still camera for taking and recording a still image.

2. Related Background Art

There are already proposed electronic still cameras for converting the image of an object into an image signal by an image pickup device such as a CCD and storing said image signal in a semiconductor memory.

Such electronic still cameras are so constructed as to focus the image of the object onto the image pickup device by means of an optical lens, to convert the analog image signal obtained by conversion in said image pickup device into digital image data by an A/D converter, and to store said digital image data into a memory card composed of a semiconductor memory.

Such conventional electronic still cameras have been associated with a drawback, in case of taking the image of an object with a wide range of brightness, because of a limited latitude of the image pickup device. In particular, the image data in high brightness regions are converted to a minimum density with a loss of tonal rendition while those in low brightness regions are converted to a maximum density with a loss of tonal rendition.

SUMMARY OF THE INVENTION

The object of the present invention is to provide an electronic still camera which does not easily provide the minimum or maximum density even for an object with a wide range of brightness, namely an electronic still camera with a wide latitude.

The above-mentioned object can be achieved, according to the present invention, by an electronic still camera provided with image pickup means for taking the image of the object plural times with different phototaking conditions (diaphragm aperture and shutter speed) and converting said image of the object into an image signal for each phototaking operation; calculating means for calculating the mean value for mutually corresponding pixels in plural image signals output from the image pickup means; and means for recording the obtained mean value on a recording medium.

In such structure with plural phototaking operations in different conditions, the tonal rendition can be represented by the mean value calculation, since an area providing maximum or minimum density in a phototaking condition gives tonal rendition in other phototaking conditions.

Thus the present invention enables avoidance of the generation of minimum and maximum densities which have frequently been encountered in the conventional electronic still camera, thereby providing images with widened latitude.

BRIEF DESCRIPTION OF THE DRAWINGS

FIG. 3 is a view of an example of the image data recorded with an appropriate exposure level;

FIG. 4 is a view of an example of image data recorded with an exposure somewhat larger than the appropriate exposure level;

FIG. 5 is a view of an example of image data recorded with an exposure somewhat smaller than the appropriate exposure level;

FIG. 6 is a view of an example of mean image data obtained from image data recorded with an exposure somewhat larger than the appropriate exposure level and image data recorded with an exposure somewhat smaller than the appropriate exposure level;

FIG. 7 is a block diagram of an electronic still camera constituting a second embodiment of the present invention; and FIG. 8 is a flow chart of the control sequence of the second embodiment of the present invention.

DETAILED DESCRIPTION OF THE PREFERRED EMBODIMENTS

Figure 1:
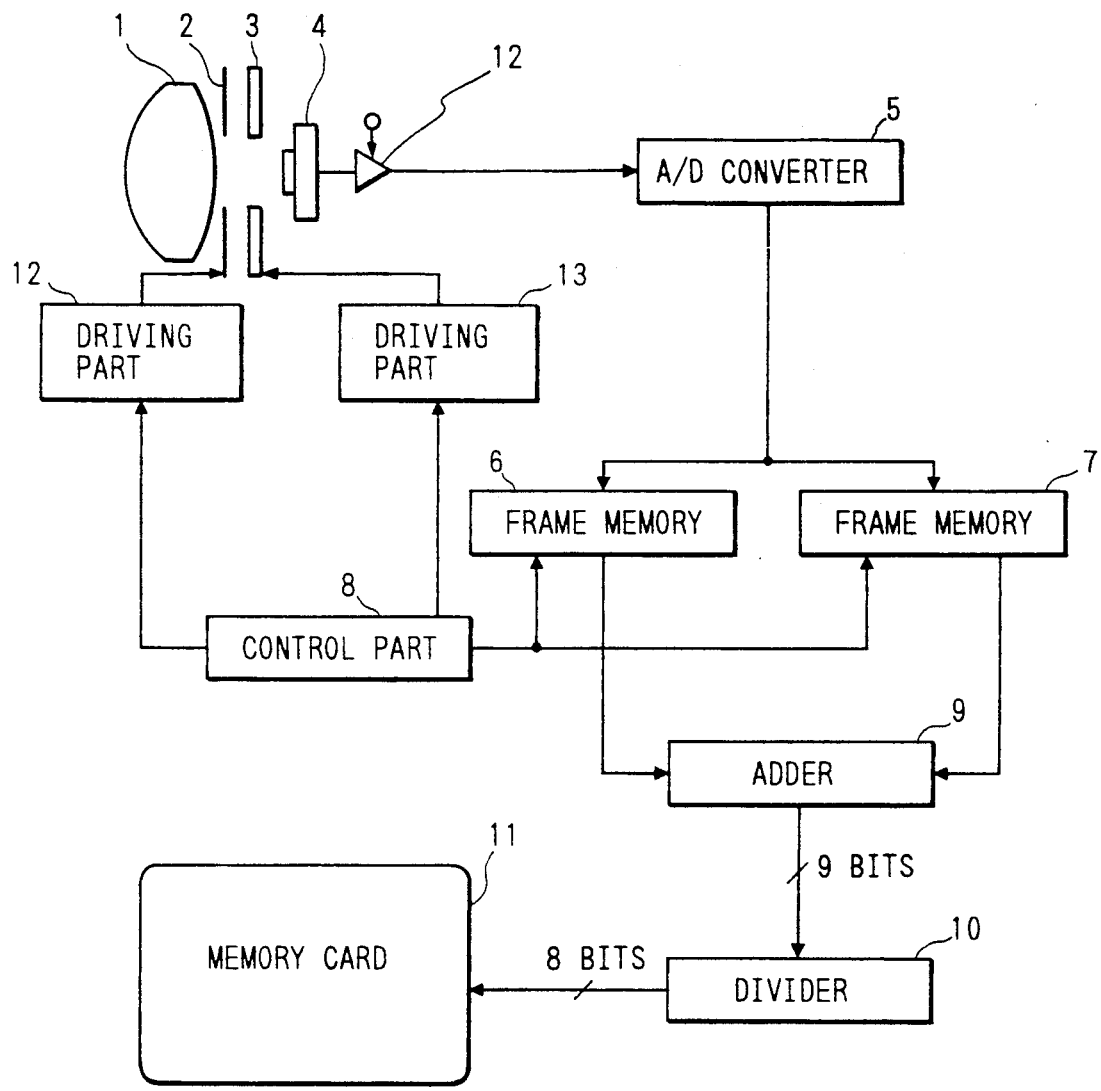
FIG. 1 is a block diagram of an electronic still camera constituting a first embodiment of the present invention.

Referring to FIG. 1, a light beam from an unrepresented object is concentrated by an optical lens 1, transmitted by a diaphragm 2 and a shutter 3, and is focused on an image taking face of a solid-state image pickup device 4 of interline transfer type. An analog image signal obtained by photoelectric conversion in said device 4 is amplified by a gain control amplifier 12 and supplied to an A/D converter 5.

Said gain control amplifier 12 has variable gain which is set in advance by the user.

The A/D converter 5 converts the analog image signal into digital image data which are supplied to a frame memory 6 or 7.

The digital image data, supplied into the frame memories 6 and 7, are sent to an adder 9, which prepares image data by adding the digital values of mutually corresponding pixels in two sets of digital image data, and sends the obtained image data to a divider 10. A control unit 8 controls a driving unit 12 for driving the diaphragm 2 and a driving unit 13 for driving the shutter 3, and provides the frame memories 6, 7 with control signals for data write-in and data read-out.

If the tonal rendition data of each pixel in the digital image data have a capacity of 8 bits, there are required 9 bits in the data of each pixel in the added image data obtained from the adder 9.

The divider 10 prepares image data by dividing, by 2, the data of each pixel of the added image data obtained from the adder 9. Thus two sets of digital image data provide a mean value in each pixel. Said division of the data of each pixel by 2 can be done in the divider 10 by obtaining 8-bit data by discarding the lowermost bit of each pixel data (9-bit data) of the added image data.

A memory card 11, consisting of a semiconductor memory, constitutes a data memory medium detachably mountable on the electronic still camera, and serves to store the digital image data consisting of mean pixel data prepared in the divider 10.

Figure 2:
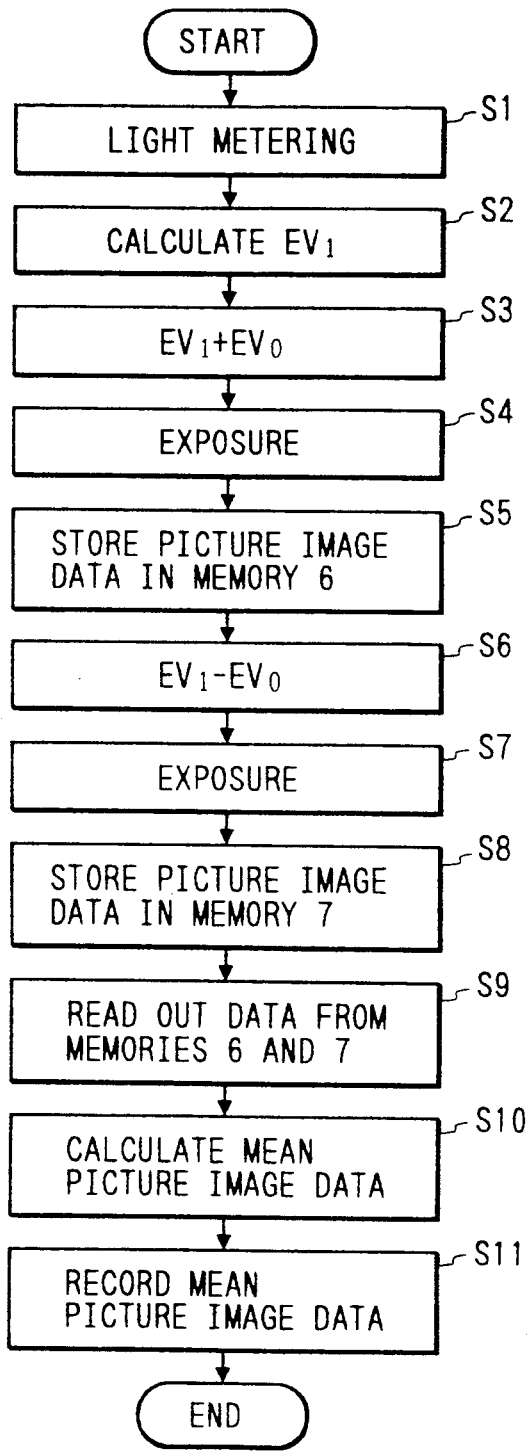
FIG. 2 is a flow chart of the control sequence of the first embodiment of the present invention.

In the following there will be explained the sequence of phototaking operation in the above-explained electronic still camera, with reference to a flow chart shown in FIG. 2.

When a shutter release button is depressed, a step S1 causes a light metering device to measure the light from the object, and a step S2 calculates an appropriate exposure level EV1 at a gain determined from the data of light metering and determines the diaphragm aperture and the shutter speed.

For a first phototaking operation, a step S3 calculates an exposure amount EV1+EV0 larger than the above-mentioned appropriate exposure level, and a step S4 performs a phototaking operation with a diaphragm aperture and a shutter speed corresponding to said exposure amount EV1+EV0, whereby the solid-state image pickup device 4 accumulates charges corresponding to the image of the object.

A step S5 reads the analog image signal of a field from the solid-state image pickup device 4 for supply through the gain control amplifier 12 to the A/D converter 5, which converts said analog image signal into the digital image data for storage in the frame memory 6.

The frame memory 6 stores the digital image data from the A/D converter 5 according to a data reading instruction signal from the control unit 8 to the frame memory 6.

Then, for a second phototaking operation, a step S6 calculates an exposure amount EV1−EV0 smaller than the aforementioned appropriate exposure level, and a step S7 performs a phototaking operation with a diaphragm aperture and a shutter speed corresponding to said exposure amount.

The deficiency in the exposure in the second phototaking operation is selected logarithmically equal to the excess in the exposure in the first phototaking operation. For example, if the shutter speed in the first phototaking operation is selected as twice of the appropriate shutter speed, the shutter in the second phototaking operation is selected as ½ of the appropriate value.

The step S7 is executed in the same manner as the step S1, but a step S8 is executed in such a manner that the control unit 8 stores the digital image data in the frame memory 7.

Consequently, two sets of digital image data obtained by two consecutive phototaking operations conducted by a shutter releasing operation are respectively stored in the frame memories 6 and 7.

Upon storage of two sets of digital image data, the control unit 8 sends, in a step S9, a data output instruction signal to the frame memories 6, 7, which in response output two sets of the digital image data.

Then a step S10 calculates the mean values of two sets of digital image data by means of the adder 9 and the divider 10, and a step S11 stores the mean tonal rendition data of the pixels in the memory card 11.

FIG. 3 shows an example of image data recorded with the appropriate exposure level FIG. 4 shows an example of image data recorded with an exposure somewhat larger than the appropriate exposure level (obtained in the first phototaking operation in the present embodiment), while FIG. 5 shows an example of image data recorded with an exposure somewhat smaller than the appropriate exposure level (obtained in the second phototaking operation in the present embodiment). FIG. 6 shows an example of the mean image data (finally obtained data in the present embodiment) obtained from the image data recorded with the somewhat larger exposure than the appropriate exposure level and those recorded with the somewhat smaller exposure than the appropriate level.

In FIGS. 3 to 6, for the purpose of simplicity, an image is assumed to consist of 64 pixels arranged by 8 pixels in the horizontal direction and 8 pixels in the vertical direction, and to be a black-and-white image. Each pixel has 256 density levels of 8 bits, with a maximum density "0" and a minimum density "255".

Referring to FIG. 3 showing an example of image data recorded with the appropriate exposure level, a white saturated area appears in the upper left portion of the image frame, and a black saturated area appears in the lower portion of the image frame.

In FIG. 4, showing an example of image data recorded with an exposure larger by EV0 than the appropriate exposure level (obtained in the first phototaking operation of the present embodiment), the white saturated area in the upper left portion of the image is expanded in comparison with FIG. 3, but the black saturated area in the lower portion of the image has disappeared.

Then, in FIG. 5, showing an example of image data recorded with an exposure smaller by EV0 than the appropriate exposure level (obtained in the second phototaking operation of the present embodiment), the black saturated area in the lower portion of the image is expanded in comparison with FIG. 3, but the white saturated area in the upper left portion of the image has disappeared.

FIG. 6 shows image data obtained as the mean value of those shown in FIGS. 4 and 5, namely obtained in the electronic still camera of the present embodiment, in which the white saturated area in the upper left portion and the black saturated area in the lower portion have both been eliminated.

FIG. 7 is a block diagram of an electronic still camera constituting a second embodiment of the present invention.

In FIG. 7, components corresponding to those in FIG. 1 are represented by same numbers and will not, therefore, be explained further. The structure shown in FIG. 7, lacks the frame memory 7, so that the function of a control unit 8a is different from that of the control unit 8 shown in FIG. 1.

In the following there will be explained the phototaking operation with the above-explained electronic still camera, with reference to a flow chart shown in FIG. 8.

There are consecutively conducted two phototaking operations as in the first embodiment. The functions are same as in the first embodiment from the depression of the shutter release button to the conversion of the analog image signal into the digital image data by the A/D converter 5. In the first phototaking operation, the digital image data are sent from the A/D converter 5 to the frame memory 6 and stored therein. Then a second exposure is conducted. The operation up to this point is safe as in the steps S1 to S7 of the flow chart shown in FIG. 2.

Then a step S12 sends the digital image data from the A/D converter 5 to the adder 9, and the digital image data of the frame memory 6 are simultaneously sent to the adder 9.

Then a step S13 calculates the mean value of two sets of the digital image data by the adder 9 and the divider 10, and a step S14 records the mean data of the pixels in the memory card 11.

In the foregoing two embodiments, two phototaking operations are consecutively conducted, and the mean values are calculated from thus obtained two sets of image data, but it is also possible to obtain the mean values from three or more phototaking operations.

In the first embodiment, two sets of image data obtained in two phototaking operations are both stored in the frame memories 6, 7, while, in the second embodiment, only the first set of the image data obtained in the first phototaking operation is stored in the frame memory 6. It is however possible also to store the image data in the memory card 11 instead of the frame memories 6, 7, to determine the mean values by reading the image data from said memory card 11, and to store the obtained mean values again in the memory card 11.

It is also possible to provide a structure which achieves the effect of the foregoing embodiments with a single phototaking operation.

For this purpose there are provided two processing systems for the image signal, by employing two units each of diaphragm, shutter, image pickup device, gain control amplifier and A/D converter. The light beam entering through the optical lens 1 is split into two beams which are respectively focused on the image pickup devices. The two A/D converters are respectively connected to the frame memories 6 and 7. In such structure, the diaphragm aperture and/or the shutter speed is so selected that the exposure amount in one system is larger than the appropriate exposure level while that in the other system is less than said appropriate level.

Also the mechanical shutter employed in the foregoing embodiments may be replaced by the control of the charge accumulating time of the solid-state image pickup device 4 by the drive timing control of the transfer gate of said device 4.

Furthermore, in the foregoing embodiments, a phototaking operation generates image signal of a field, but the system may be so constructed as to generate image signal of a frame in each phototaking operation.

What is claimed is:

1. An electronic still camera comprising:
    image pickup means for converting the image of an object input through a phototaking lens into an image signal;
    calculation means for calculating an appropriate exposure amount of the object image;
    regulation means for regulating the amount of exposure in said image pickup means;
    means for producing a mean image signal, including control means for causing said image pickup means to generate only two image signals of the object and controlling said regulation means in such a manner that one of said two image signals has a first exposure amount greater than said calculated appropriate exposure amount and the other of said two image signals has a second exposure amount less than said calculated appropriate exposure amount, and further including mean value determination means for calculating the mean value of corresponding pixel data from each of said two image signals so as to determine said mean image signal; and
    means for storing said mean image signal.

2. An electronic still camera according to claim 1, wherein said image pickup means produces an analog image signal, said mean value determination means includes means for converting the analog image signal into digital image data and memory means for storing digital image data of said two image signals, and said mean value determination means is adapted to calculate the mean value for each pixel of the object image based on the corresponding stored digital image data of said two image signals.

3. An electronic still camera according to claim 1, wherein said image pickup means produces an analog image signal, said mean value determination means includes memory means and conversion means for converting the analog image signal into digital image data, and said mean value determination means stores the digital image data from a first of said two image signals in said memory means and calculates, for each pixel of the object image, the mean value of the stored digital image data for that pixel and corresponding digital image data for that pixel from a second of said two image signals output from said conversion means.

4. An electronic still camera according to claim 1, wherein a ratio of said first exposure amount to said calculated appropriate exposure amount is equal to a ratio of said calculated appropriate exposure amount to said second exposure amount.

5. An electronic still camera according to claim 1, further comprising first memory means for storing the image signal generated with said first exposure amount and second memory means for storing the image signal generated with said second exposure amount.

6. An electronic still camera according to claim 5, wherein said calculating means calculates said appropriate exposure amount in response to actuation of shutter release means, whereafter said two image signals are generated and stored, respectively, in said first and second memory means, and wherein said mean value determination means determines said mean image signal from the image signals stored in said first and second memory means.

* * * * *